(12) United States Patent
Adams et al.

(10) Patent No.: US 6,515,493 B1
(45) Date of Patent: Feb. 4, 2003

(54) METHOD AND APPARATUS FOR IN-SITU ENDPOINT DETECTION USING ELECTRICAL SENSORS

(75) Inventors: John A. Adams, Escondido, CA (US); Thomas F. A. Bibby, Jr., St. Albans, VT (US)

(73) Assignee: SpeedFam-IPEC Corporation, Chandler, AZ (US)

( * ) Notice: Subject to any disclaimer, the term of this patent is extended or adjusted under 35 U.S.C. 154(b) by 0 days.

(21) Appl. No.: 09/547,579

(22) Filed: Apr. 12, 2000

(51) Int. Cl.[7] ........................ G01R 27/08; H01L 21/302; B24B 5/18
(52) U.S. Cl. .................. 324/716; 438/692; 451/141
(58) Field of Search ...................... 324/715, 716, 324/719, 765, 754, 760; 438/10, 17, 691, 692; 451/6, 141; 205/87, 123

(56) References Cited

U.S. PATENT DOCUMENTS

| | | |
|---|---|---|
| 5,321,304 A | 6/1994 | Rostoker |
| 5,691,648 A * | 11/1997 | Cheng ........................ 324/715 |
| 6,132,586 A * | 10/2000 | Adams et al. .............. 205/123 |
| 6,143,155 A * | 11/2000 | Adams et al. ................. 205/87 |

FOREIGN PATENT DOCUMENTS

| | | |
|---|---|---|
| EP | 0 325 753 | 8/1989 |
| EP | 0 455 455 | 11/1991 |

OTHER PUBLICATIONS

Applicant is not Aware of any Patents, Publications, or Other Information for Consideration by the Patent Office.

* cited by examiner

Primary Examiner—N. Le
Assistant Examiner—James Kerveros
(74) Attorney, Agent, or Firm—Snell & Wilmer, L.L.P.

(57) ABSTRACT

A method and apparatus for determining the endpoint of a planarization process during chemical mechanical planarization (CMP) and more specifically for determining endpoint of a planarization process for a thin metal film deposited on a wafer's surface and/or a method of altering the plating and deplating of the thin metal film during the planarization process. The apparatus includes one or more probes embedded in a working surface. The probes are in electrical communication with the thin film on the wafer's surface as it is planarized against the working surface. The probes measure the thickness of the thin metal film and/or induce a current in the thin metal film to adjust the plating and deplating that occurs during the planarization process.

19 Claims, 6 Drawing Sheets

METHOD AND APPARATUS FOR IN-SITU ENDPOINT DETECTION USING ELECTRICAL SENSORS

TECHNICAL FIELD

The present invention relates generally to the art of monitoring a wafer's surface during a planarization process, and more particularly, relates to an improved apparatus whereby a plurality of electrical probes are used to detect endpoint during a chemical-mechanical planarization process.

BACKGROUND OF THE INVENTION

Chemical-mechanical planarization (CMP) is now common in the manufacturing process of semiconductors. Semiconductors are constructed of multiple layers of material deposited on a wafer. CMP may be used throughout the manufacturing process of semiconductors to planarize the various layers of material deposited on the wafer. For example, CMP may be used to planarize the surface of a raw wafer or the surface of the wafer after a thin dielectric or conductive layer of material has been deposited on the wafer. The need for wafers to have a planar surface during the manufacturing process continues to increase as the size of the devices and interconnects used to manufacture semiconductors continues to decrease.

CMP is generally accomplished by pressing a surface of the wafer against a polishing pad attached to a rotating or orbiting platen in the presence of slurry. During the planarization process, it is desirable to gather data on the condition of the wafer's surface. The data may then be used to optimize the planarization process or to determine when the planarization process should be terminated (referred to as endpoint).

It is generally preferred for endpoint systems to be in-situ systems to provide endpoint during the polishing process. Numerous in-situ endpoint systems have been proposed, but few have been successful in a manufacturing environment and even fewer are sufficiently robust for routine production use.

One approach that has proven production worthy is to measure changes in the friction between the wafer being polished and the working surface (generally a polishing pad). Such measurements are made by sensing changes in the motor current for the polishing platen. These systems use a global approach, i.e. the measured signal assesses the entire wafer surface. Thus, these systems do not obtain specific data about localized regions. Further, these endpoint systems work better for tungsten metal CMP because of the dissimilar coefficient of friction between the polish pad and the tungsten-titanium nitride-titanium film stack versus the polish pad and the dielectric underneath the metal. However, with advanced interconnection conductors, such as copper (Cu), the associated barrier metals, e.g. tantalum or tantalum nitride, may have a coefficient of friction that is similar to the underlying dielectric. The change in motor current, when transitioning between materials with similar coefficients of frictions, will be very small and difficult to detect. In addition, the motor current approach relies on detecting the Cu-tantalum nitride transition, then adding an over-polish time. Intrinsic process variations in the thickness and composition of the remaining film stack layer means that the final endpoint trigger time may be less precise than desirable.

Another group of approaches for detecting endpoint uses an acoustic approach. In a first acoustic approach, an acoustic transducer generates an acoustic signal that propagates through the surface layer(s) of the wafer being polished. Some reflection occurs at the interface between the layers, and a sensor positioned to detect the reflected signals can be used to determine the thickness of the topmost layer as it is polished. In a second acoustic approach, an acoustical sensor is used to detect the acoustical signals generated during CMP. Such signals have spectral and amplitude content which evolves during the course of the polish cycle. However, to date there has been no commercially available in-situ endpoint detection system using acoustic methods to determine end point.

Optical techniques are a common method of gathering data on the condition of a wafer's surface during CMP. One such optical technique involves reflecting light off the surface of a wafer and capturing the reflected light by a properly positioned receptor. The receptor funnels the reflected light through a fiber optic cable to a desired metrology instrument that analyzes the data. The CMP tool is then able to act upon the analyzed data and may alter an operational parameter or terminate the planarization process.

Conventional optical techniques face many different technical challenges due to the hostile CMP environment. Wafers are typically planarized face-down on a polishing pad making it difficult to have direct optical communication with the wafer's surface. In order to take measurements of the wafer's surface, holes or transparent areas generally need to be manufactured into the polishing pad or the wafer may be allowed to travel over the edge of the polishing pad. However, allowing holes or transparent areas in the polishing pad, or polishing over the edge of the polishing pad, introduce variables into the CMP process that may not be desirable.

Another common problem for optical techniques is that slurry is generally used during the CMP process. The slurry may attenuate, or in some cases totally block, the optical signal. The optical signal must also typically travel through an air-slurry and slurry-wafer interface that distorts the measurements of the wafer's surface.

Yet another problem for monitoring a wafer's surface using optical techniques is that the wafer's surface may have been built up by sequentially depositing multiple thin films on top of each other. Some of the deposited thin films may be made of oxides that are relatively transparent while other deposited thin films may be partially made of metals that are opaque to optical monitoring techniques. The problem arises that while desiring to monitor only the top thin film, optical techniques often receive so much noise produced by the lower thin film levels that it is difficult to make accurate measurements of the top thin film. In addition, the manufacturing process for semiconductors produces a nonuniform surface for the wafer whereby every point does not look like every other point on the wafer's surface.

Yet another problem for using optical techniques to measure a wafer's surface is that relative motion is required between the wafer and the polishing pad. Wafers are typically orbited, oscillated and/or moved linearly across a polishing pad while the polishing pad is typically simultaneously rotated, orbited or moved linearly. The constant relative motion between the wafer and the polishing pad makes it difficult to take repeatable measurements at the same point on a wafer's surface.

Yet another problem with optical techniques is that the measurements of the wafer's surface must be taken and analyzed quickly if the results are to be useful in the planarization process for the wafer. The optical measurements received from the wafer's surface are often very complex and intermingled with noise from the slurry and/or lower thin film layers. Multiple algorithms generally need to be run on the optical measurements taken from the wafer's surface before useful information is obtained. However, the planarization process for the wafer often requires the process to be stopped in real time with sub-second accuracy or the wafer may be under or over-polished.

Another approach for monitoring in-situ the change in thickness of a conductive thin film on a wafer's surface is by indirectly inducing a current in the film and then detecting the current with a sensor comprising a capacitor and an inductor. As the thickness of the film changes (either increase or decrease), the changes in the current may be detected. Eddy currents are induced in the conductive film by generating an alternating electromagnetic field near the thin film. However, the signal strength of the endpoint signal may be affected in ways that are difficult to account for by wafers that have multiple metallized layers. In addition, the electromagnetic field may introduce harmful voltages and currents in the underlying active devices due to the penetrating nature of the magnetic field. While the non-contact nature of the measurement is desirable, the uncertainty in the location of the endpoint due to underlying metal traces and potential damage to the underlying active devices makes this approach problematic.

What is needed is a method and apparatus for detecting endpoint of a planarization process which is not significantly affected by a polishing pad blocking the view of a wafer's surface, slurry covering the wafer's surface, multiple opaque, transparent, or conductive layers on the wafer's surface or movement between the wafer and the polishing pad. The monitoring system must also prevent damage to the wafer and perform quickly so that results produced can be used in real time.

SUMMARY OF THE INVENTION

Thus, it is an object of the present invention to provide a method and apparatus for determining the endpoint for a planarization process and/or to improve the planarization process.

One embodiment of the present invention has a working surface, for example a polishing pad, that is useful for planarizing a thin metal film that has been deposited on a wafer's surface. A probe is positioned to take measurements of the wafer's surface as the wafer's surface is being planarized against the working surface. The probe may be fixed in position relative to the moving working surface, but is preferably embedded in the working surface so as to move in conjunction with the working surface. The probe may have two points for measuring resistance or impedance. However, it is preferable for the probe to have four points, two for inducing a current in the thin film and two for measuring a voltage between two points on the thin film within the current area. The resistance, impedance or voltage read may be used to determine certain characteristics regarding the wafer's surface. The points on the probe, whether two or more are used, must be in electrical communication with the thin metal film on the wafer's surface. The points may contact the thin metal film directly, use part of the working surface to complete the electrical connection and/or use a conductive solution introduced during the planarization process to complete the electrical connection. The conductive solution may take the form of conventional slurry, slurry that has been altered to have a desired resistance or a separately added fluid. The conductive solution may be introduced by pumping it through the working surface or by depositing it on the working surface.

The probe may be adapted to communicate with a metrology instrument that is able to analyze the signals captured by the probe. The probe may communicate with the metrology instrument using RF signals, electrical wires, optical paths (such as fiber optic cables) or other known communication techniques. The metrology instrument may be an ohmmeter or an impedance meter, but is preferably a combination current source and voltmeter. If the metrology instrument is a current source and voltmeter, the current may be DC, AC or a combination with the frequency for the AC in the range from a few Hertz to the megahertz range. However, the preferred current is AC in the kilohertz range.

The metrology instrument sends information regarding its measurements to a control system that is able to terminate or alter other parameters of the planarization process once the thin metal film on the wafer's surface has reached a desired condition.

An example of the present invention in operation starts with a wafer being planarized against a working surface, such as a polishing pad. A probe may be embedded within the working surface so that as the working surface travels under the wafers surface, the probe also travels under the wafer's surface bringing the probe into electrical communication with a thin film on the wafer's surface. Two points on a four-point probe may be used to induce a current in the thin film and the other two points may be used to detect a voltage drop on the thin film within the area of induced current. The voltage drop may then be used to calculate the thickness or determine other parameters of the thin film on the wafer's surface. Once the voltage or calculated thickness reaches a particular condition, the planarization process may be altered or terminated.

Another example of the present invention in operation is similar to the above described method. However, in this embodiment, the current induced in the wafer's surface is used for more than creating a voltage drop between two points on the wafer's surface. The current also affects the rate of plating and deplating of the thin metal film on the wafer's surface. By altering the frequency and duration for inducing the current, the plating and deplating of particular areas of the thin film on the wafer's surface may be controlled.

These and other aspects of the present invention are described in full detail in the following description, claims and appended drawings.

BRIEF DESCRIPTION OF THE DRAWINGS

The present invention will hereinafter be described in conjunction with the appended not-to-scale drawing figures, wherein like numerals denote like elements, and.

DETAILED DESCRIPTION OF THE EXEMPLARY EMBODIMENTS

An exemplary application of the present invention will now be discussed. This section illustrates aspects of the invention, and points out certain preferred embodiments of these aspects. This section is not intended to be exhaustive, but rather to inform and teach the person of skill in the art who will come to appreciate more fully other aspects, equivalents, and possibilities presented by the invention, and hence the scope of the invention as forth in the claims, which alone limit its scope.

Figure 1:
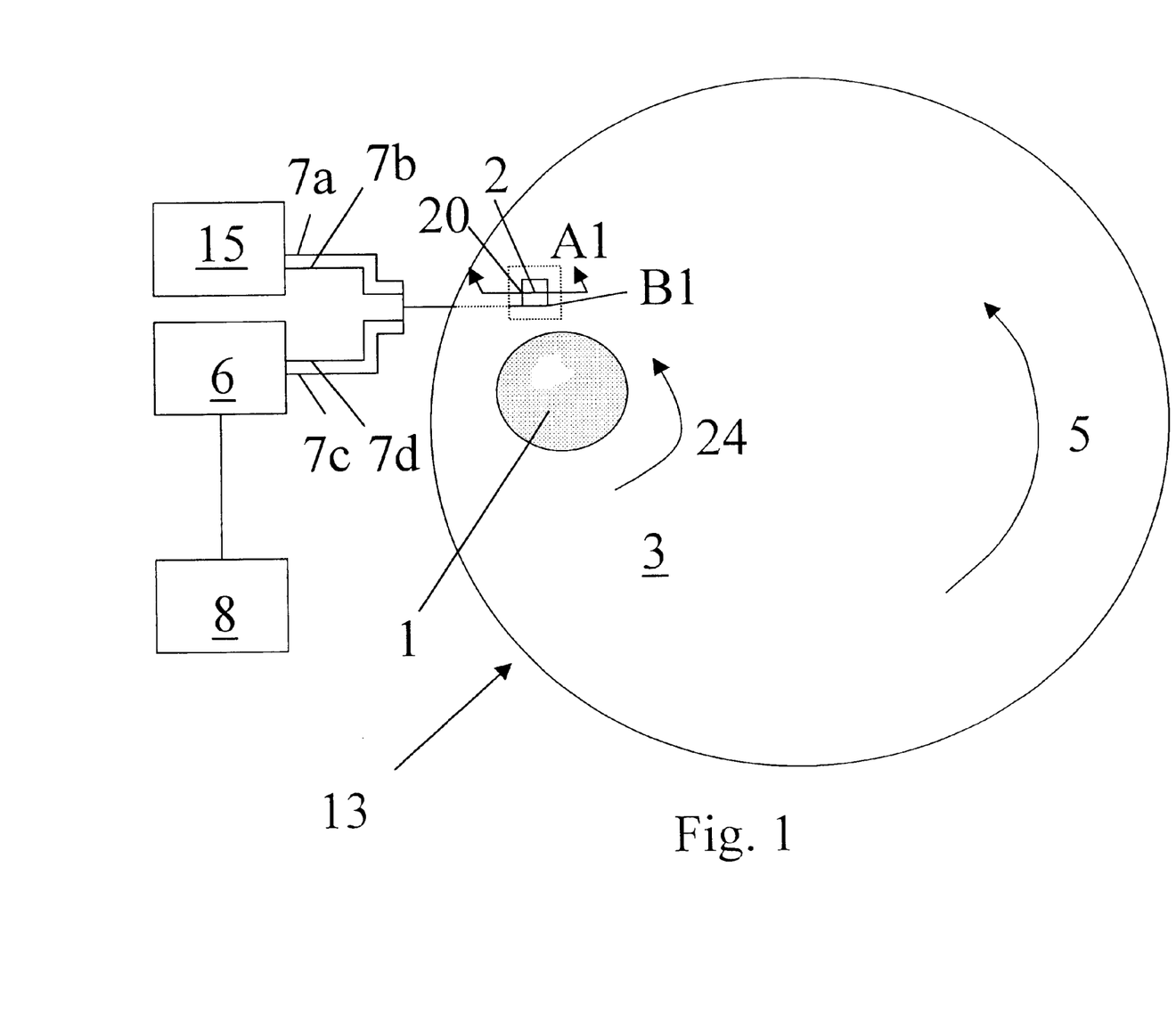
FIG. 1 is a top plan view of a CMP tool with a four point probe in-situ monitoring system.

FIGS. 4a–4d illustrate four sequential magnified top views and FIGS. 5a–5d illustrate four sequential magnified cross sectional views of a semiconductor wafer 1, the preferred workpiece for the present invention, as it is planarized. The present invention is preferably used to monitor the planarization process of a wafer 1 that has had a thin conductive or metal film 21 deposited over a dielectric layer 22. Referring to FIG. 1, the film on the wafer's surface (not shown) is polished by pressing the wafer's working surface against a working surface 13 that may be part of a CMP tool. U.S. Pat. No. 5,498,196 shows an example of a rotational CMP tool and is hereby incorporated by reference. Relative motion is required between the wafer's surface and the top layer of the working surface 13, for example a polishing pad 3, to planarize the wafer's surface. The relative motion between the wafer's surface and the polishing pad 3 on the working surface 13 should result in the travel of the wafer's surface near at least one probe 20 that has advantageously been embedded in a portion of the working surface 13. The preferred relative motions between the wafer's surface and the working surface 13 are to rotate the wafer 1 about its center axis in the direction indicated by arrow 24 and to rotate the working surface 13 about its center axis in the direction indicated by arrow 5. In addition to the traditional rotary motions for CMP, the present invention may be utilized in other planarization tools utilizing orbital, linear or other motions for either the wafer 1 or working surface 13 or both. The present invention is not tied to any particular type of relative motion between the wafer 1 and the working surface 13. However, the motion must, at least periodically, bring the surface of the wafer sufficiently close to a probe 20 for the probe 20 and the surface of the wafer to be in electrical communication with one another.

Figure 2A:
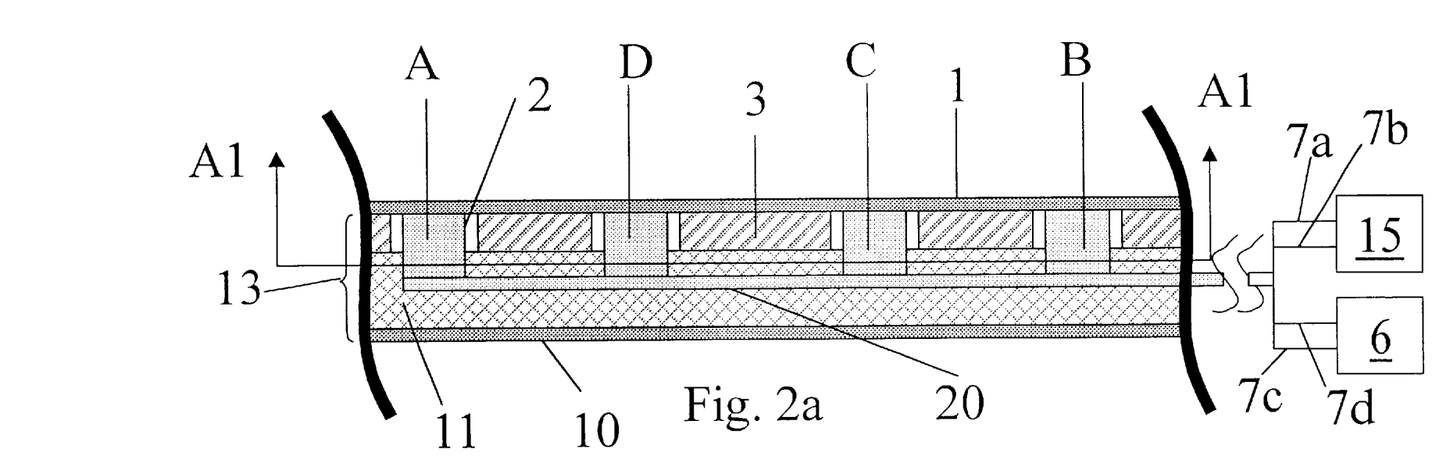
FIG. 2a is a cross-sectional view of section A1 on FIG. 1 showing a platen, sub-polishing pad, four points of a probe, polishing pad and wafer showing a direct electrical connection between the wafer and the four points on the probe.
Figure 2B:
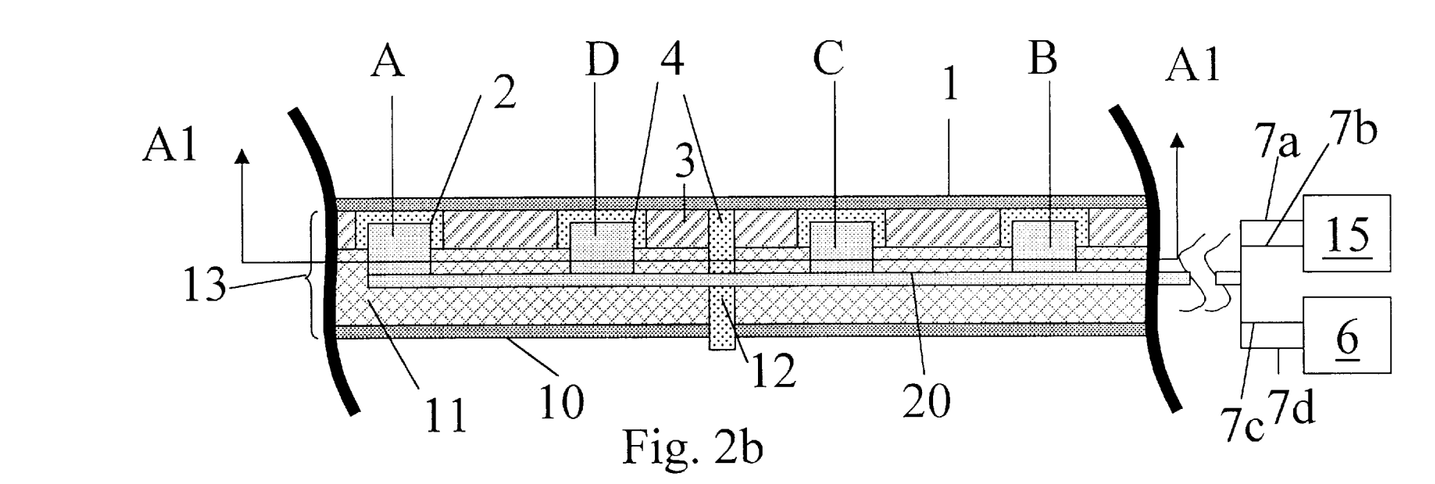
FIG. 2b is a cross-sectional view of section A1 on FIG. 1 showing a platen, sub-polishing pad, four points of a probe, polishing pad and wafer showing an electrical connection through slurry between the wafer and the four points on the probe.
Figure 2C:
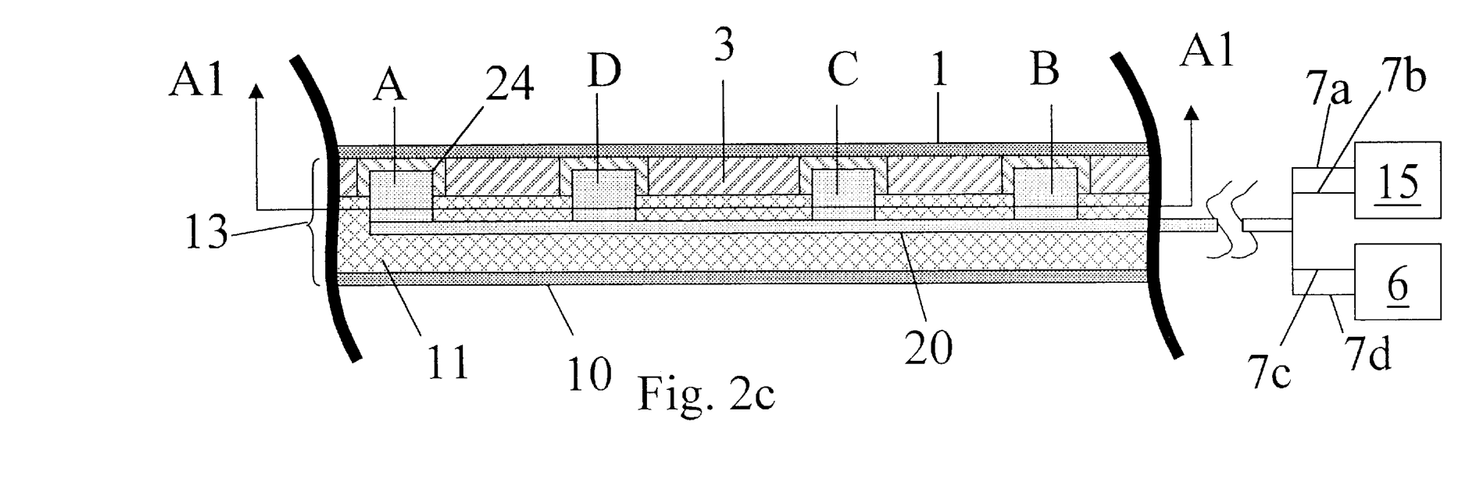
FIG. 2c is a cross-sectional view of section A1 on FIG. 1 showing a platen, sub-polishing pad, four points of a probe, polishing pad and wafer showing an electrical connection through a plug in the polishing pad between the wafer and four points on the probe.

Several embodiments of the working surface 13 will now be discussed. As illustrated in FIGS. 2a, 2b and 2c, the wafer's surface is planarized against a working surface 13 comprising several layers. The bottom layer of the working surface 13 is preferably a planar rigid aluminum platen 10. The top layer, generally referred to as a polishing pad 3 herein, may be, for example, a microreplicated pad with fixed abrasives, such as the Slurry Free pad made commercially available by Minnesota Mining and Manufacturing Company from St. Paul, Minn. or an IC1000 sold by Rodel Incorporated from Newark, Del. The IC1000 is a conventional CMP pad made of polyurethane. An intermediate layer, referred to herein as a pad backer 11, is preferably positioned between the platen 10 and the polishing pad 3. The pad backer may be made of urethane and, when made of urethane, is preferably between 1 mm and 10 mm in thickness.

A conductive solution 4 (shown only in FIG. 2b) may be introduced between the surface of the wafer and the polishing pad 3 by pumping it through holes 12 (a single hole is shown in FIG. 2b) in the working surface 13 or by depositing it on the working surface 13. The conductive solution 4 may take the form of conventional slurry (if it is conductive), slurry that has been altered to be conductive or a separately added conductive fluid. Slurry is commercially available from CABOT Corporation of Aurora, Ill. or Rodel of Newark, Del. and may be of the type specifically designed to planarize a metal layer. The purpose of the conductive solution 4, when used, is to complete or enhance the electrical communication between the points on the probe and the thin metal film on the surface of the wafer.

Figure 3A:
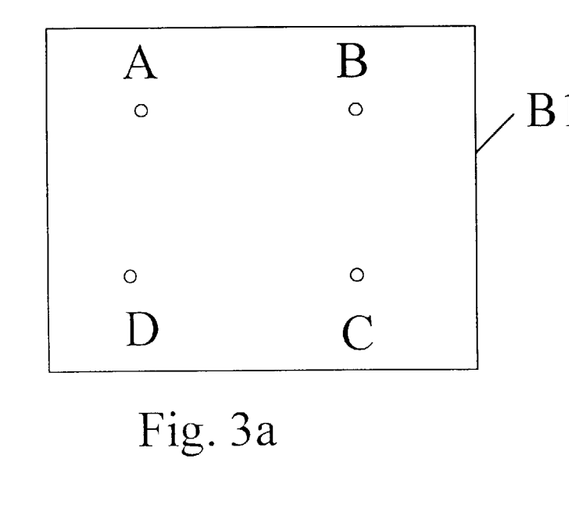
FIG. 3a is a magnified top plan view of area B1 on FIG. 1 showing a possible layout for the four points on a four point probe.

The present invention may have only a single probe 20 embedded in the working surface 13, but preferably has a plurality of probes 20. Each probe 20 may have two points, which are sufficient for taking resistance measurements, or four points, which are sufficient to find a thin film's thickness using Van der Pauw's theorem. Van der Pauw's theorem (solved for T) is as follows:

$$T = \frac{I_{AB} * \text{Ln}2 * \rho}{V_{DC} * \pi}$$

where T is the thickness of the thin film, $I_{AB}$ is the current induced from point A to point B, $\rho$ is the resistivity of the thin film and $V_{DC}$ is the measured voltage at point D in relation to point C. The thin film's resistivity may be found in a number of reference books, such as the CRC Handbook of Chemistry and Physics—$63^{rd}$ edition by CRC Press, Boca Raton, Fla. If the thin film is copper, the resistivity is 1.7241 microhm-centimeters at 20 degrees Celsius for annealed copper. The points A, B, C and D on the probe(s) 20 are preferably 10 mm apart and arranged as shown in FIG. 3a.

Figure 3B:
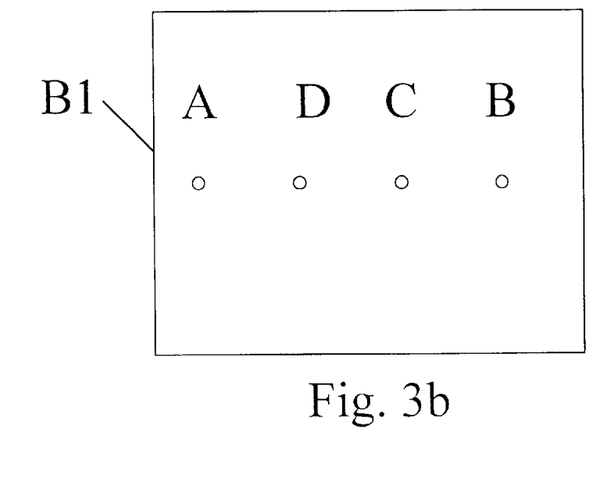
FIG. 3b is a magnified top plan view of area B1 on FIG. 1 showing a possible layout for the four points on a four point probe.

However, measurements may also be used with other probe spacings and other point A, B, C and D arrangements such as that shown in FIG. 3b.

FIGS. 2a, 2b and 2c illustrate three possible embodiments of the present invention using a four-point (A, B, C and D) probe 20. The points on the probe 20 are preferably insulated from each other so that all electrical communication between the points must travel through the thin film on the surface of the wafer. Other electrical communication paths between the points may act as shunts and attenuate the signal strength thereby reducing the accuracy of the measurements. To assist in eliminating undesirable shunts, the polishing pad 3 and pad backer 11 are preferably made of nonconductive materials.

Referring to FIG. 2a, the four points A, B, C and D are positioned within holes 2 in the working surface 13 so as to be able to make direct physical contact with the surface of the wafer. The direct connect method is the most reliable, however the points on the probe 20 may have the undesirable characteristic of scratching the thin film on the surface of the wafer. Optionally, a conductive solution 4 (as shown in FIG. 2b) or a conductive slug 24 surrounding the points (as shown in FIG. 2c) may be combined with the direct connect method to enhance the electrical communication between the surface of the wafer and the points on the probe 20.

Referring to FIG. 2c, the points of the probe 20 may be embedded within a conductive slug 24, with the conductive slug 24 making direct physical contact with the surface of the wafer. In this way, the points of the probe 20, typically made of metal, are prevented from scratching or contaminating the surface of the wafer. For this probe layout, it is desirable to make the conductive slugs 24 out of a conducting material that is non-contaminating and that has material properties similar to the polishing pad 3 being used. For example, graphite embedded into a urethane matrix would provide electrical contact while having properties similar to typical polishing pads 3.

The preferred method of making an electrical connection between the points A, B, C and D of a probe 20 and the surface of the wafer is to use an electrical coupler comprising a conductive solution 4 as shown in FIG. 2b. The probes 20 are routed through the working surface 13 and the points A, B, C and D are extended through four corresponding holes 2. The points of the probe 20 should be positioned at least two millimeters away from the top of the working surface 13 to avoid scratching or contaminating the surface of the wafer. A conductive solution 4 may be introduced through a plurality of feed holes 12, which are preferably about 1.75 mm in diameter, or may simply be deposited near the center of the working surface 13. The conductive solution 4 fills the holes 2 in the polishing pad 3 and creates a film of conductive solution 4 between the surface of the wafer and the polishing pad 3. As the wafer 1 travels over the holes 2, the conductive solution 4 acts as a shunt, but the thin metal film on the surface of the wafer acts as a greater shunt. As more of the thin metal film is cleared from the surface of the. wafer, the resistance is raised and is subsequently measured.

Referring to FIGS. 1, 2a, 2b and 2c, a current may be induced in the thin film on the surface of the wafer after the points A, B, C and D of the probe 20 and the surface of the wafer have been placed in electrical communication with one another. The electrical current may be generated with a current source 15 connected to wires 7a and 7b that are connected to points A and B on the probe respectively. The current travels from point A to point B on the probe 20 with a portion of the current traveling through the thin film on the surface of the wafer. A voltmeter 6 measures the voltage at point C in reference to point D on the probe 20 through cables 7c and 7d that has resulted from the current induced from point A to point B. Van der Pauw's theorem may then be used to predict the thickness of the thin film 21 on the surface of the wafer. Amplifier(s) may be advantageously placed in the pad backer 11 to minimize the noise in either the current circuit or the voltage measurement circuit. The probe 20, current source 15 and voltage meter 6 may be purchased from Bridge Technology in Chandler Heights, Ariz.

Figure 6:
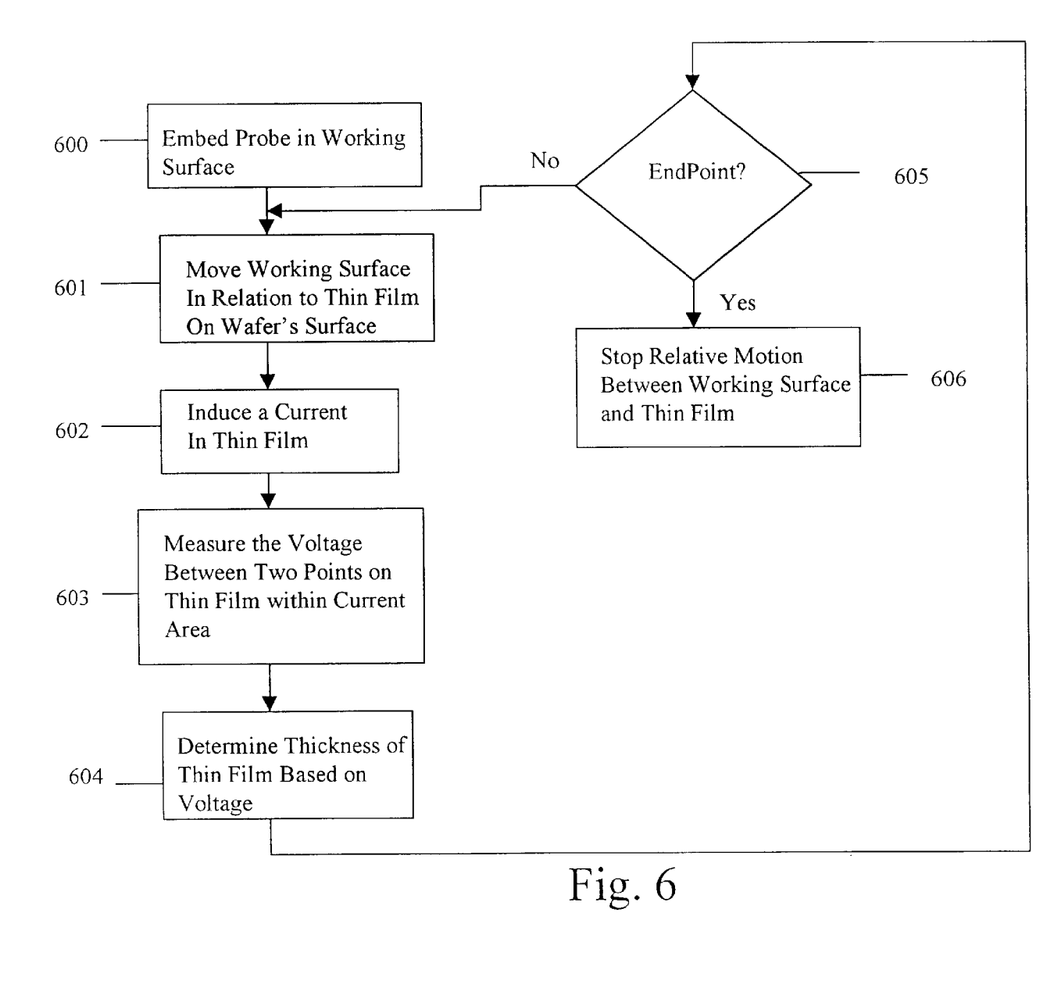
FIG. 6 is a schematic flow chart illustrating a preferred process for the present invention.

An example of a preferred process for the present invention will now be discussed with reference to FIGS. 1, 2b and 6. This exemplary process starts by embedding a probe 20 into a working surface 13 (step 600) for a CMP tool. The points on the probe 20 are insulated from each other by surrounding the points with nonconductive materials within the working surface 13. The points on the probe 20 may make electrical contact with the surface of the wafer via a conductive solution 4 that has been pumped through a plurality of holes 12 in the working surface 13. The thin metal film on the surface of the wafer is pressed against the polishing pad 3, preferably in the presence of a slurry that enhances the planarization process. Relative motion is generally required between the surface of the wafer and the polishing pad 3 to remove material from the thin film on the surface of the wafer and to bring the surface of the wafer in electrical communication with the points on the probe(s) 20 (step 601).

When the surface of the wafer is in electrical communication with the points on the probe 20, a predetermined current is induced by a current source 15 from point A to point B creating a current in the thin film 21 (step 602). The current in the thin film creates a voltage potential at point D in relation to point C. A voltage meter 6 reads the voltage from point D in relation to point C (step 603) and calculates the thickness of the thin film 21. Van der Pauw's theorem or an empirically determined relationship (step 604) may be used to determine the thickness of the thin film. A control system 8, shown in FIG. 1, may read the voltage or thickness measurement and take appropriate actions (step 605). The type of control system 8 is not critical for the present invention, but may be, for example, a controller, single computer or a network of computers. If it is determined that the planarization process is finished, i.e., the end-point has been reached, the planarization process may be terminated (step 606). Otherwise, the planarization process continues with further measurements being taken.

Figure 4A:
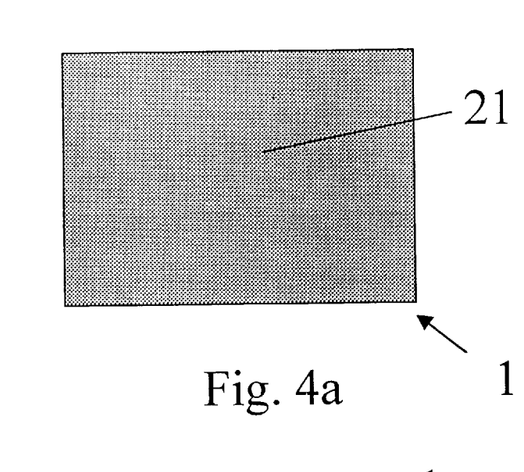
FIG. 4a is a magnified top view of a section of the surface of a wafer totally covered by a thin metal layer prior to planarization.
Figure 4B:
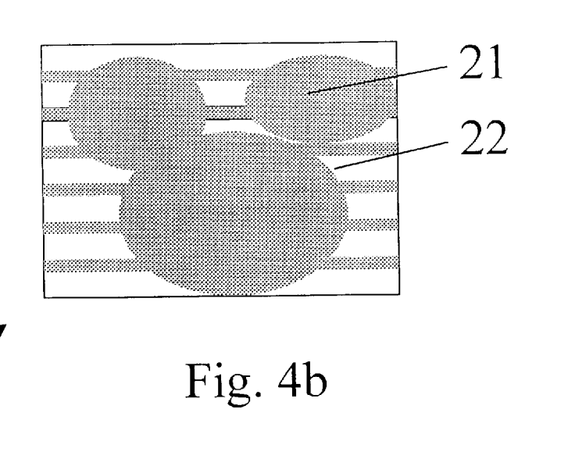
FIG. 4b is a magnified top view of a section of the surface of a wafer as parts of a dielectric layer start to appear through the metal layer.
Figure 4C:
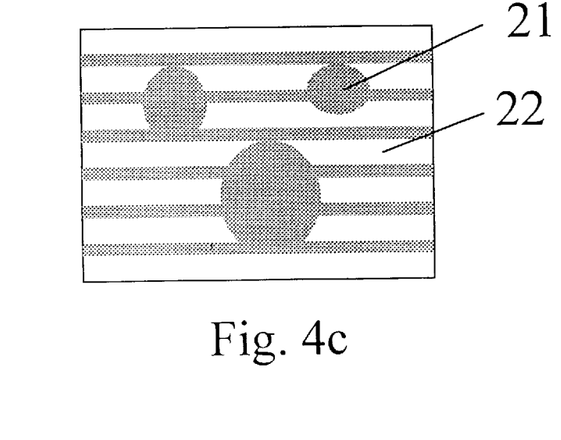
FIG. 4c is a magnified top view of a section of the surface of a wafer showing most of a dielectric layer as almost all the top metal top layer has been removed.
Figure 4D:
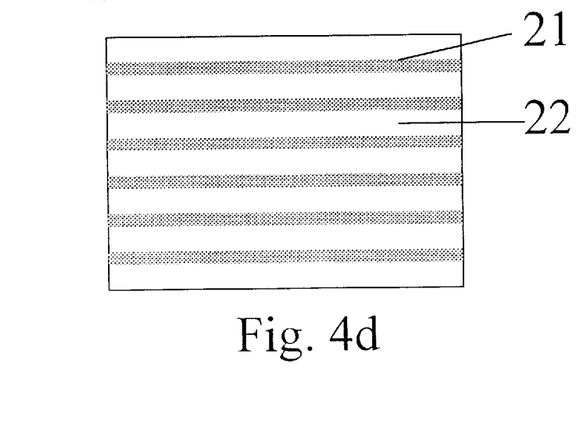
FIG. 4d is a magnified top view of a section of the surface of a wafer with the top metal layer removed and only metal channels in the dielectric layer remain.
Figure 5A:
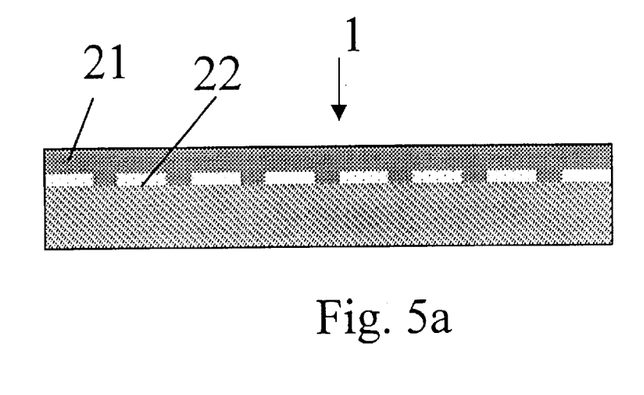
FIG. 5a is a magnified cross sectional view of a wafer totally covered by a thin metal layer prior to planarization.
Figure 5B:
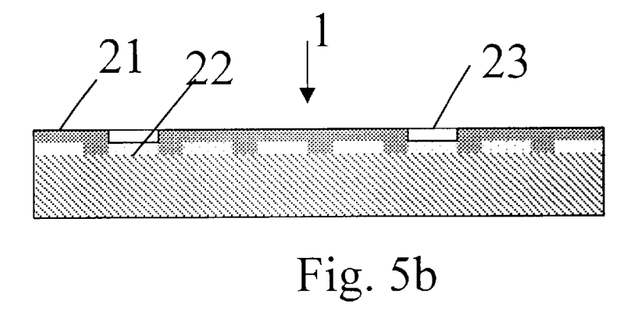
FIG. 5b is a magnified cross sectional view of a wafer as parts of a dielectric layer start to appear through the metal layer.
Figure 5C:
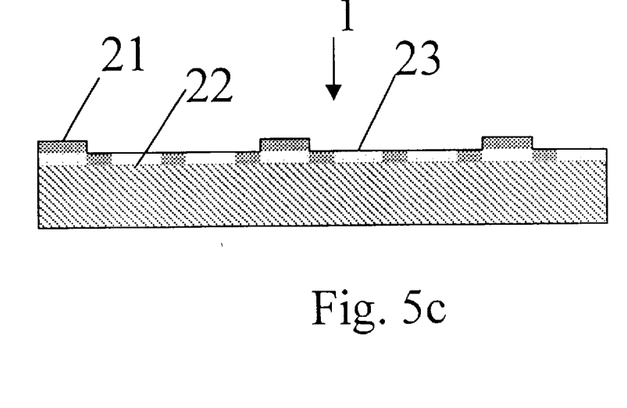
FIG. 5c is a magnified cross sectional view of a wafer showing most of a dielectric layer as almost all the top metal top layer has been removed.
Figure 5D:
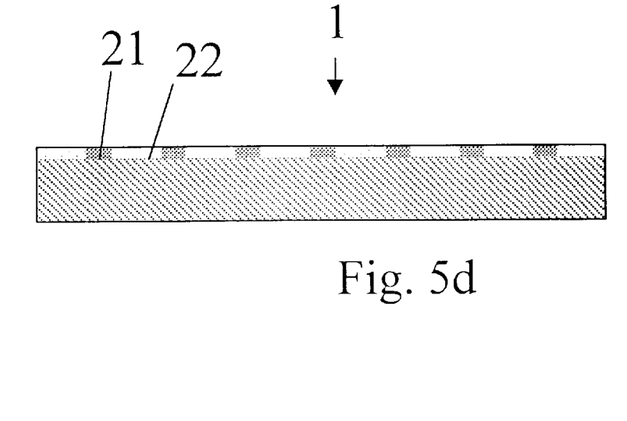
FIG. 5d is a magnified cross sectional view of a wafer after the top metal layer has been removed and only metal channels in a dielectric layer remain.

An enlarged top plan view is shown in FIG. 4a, 4b, 4c and 4d and an enlarged cross sectional view is shown in FIG. 5a, 5b, 5c and 5d illustrating four stages of a typical planarization process of a thin film 21 on the surface of the wafer. FIGS. 4a and 5a show the first stage of the thin metal film 21 after being deposited on the surface of the wafer. As material is removed from the thin metal film 21 during the planarization process, sections 23 of the dielectric layer 22 start to show through the thin metal film 21 as shown in FIGS. 4b and 5b. The probe 20 will continue to record a decrease in the thickness of the metal film 21 as larger sections 23 of the dielectric layer 22 show through the thin metal film 21 as illustrated in FIGS. 4c and 5c. Once islands of metalization appear as shown in FIGS. 4b, 4c, 5b and 5c, the measurements will start to vary greatly since some readings will be taken on the metal film 21 while other readings will be taken on the dielectric layer 22. The readings will start as all metal film 21 readings, progress to a rapid variation mode as the area of metal film 21 is roughly equal to the area of exposed dielectric layer 22, and will end as mostly dielectric layer 22 readings. The percentage of readings that are coming from the dielectric layer 22 will increase through the process and is an indicator that endpoint is nearing. In addition, the time spent in the rapid variation mode is indicative of the overall non-uniformity of the metal film 21 clearing, with a short time indicating a better process than a longer time. Once the thin metal film 21 has reached the desired condition as shown in FIGS. 4d and 5d, the thickness measurement will have reached its minimum and the control system 8 may terminate the planarization process.

The voltage readings and thickness measurements may have a tendency to vary depending on the particular planarization process being used. For example, changing the down force on the wafer 1, wafer 1 movement over the probes 20, type of conductive solution 4, type of working surface 13, age of working surface 13 or other variables may alter the readings. Empirical methods may be required to find an adjusted voltage or thickness calculation that indicates a desired endpoint for a particular planarization process. Future processes may then be fine-tuned by looking for the adjusted voltage or thickness measurement based on the results from the empirical method for the particular planarization process being used.

In addition to determining an endpoint for a planarization process, the present invention may also be used to selectively plate or deplate areas on the wafer. Pending U.S. patent applications Ser. No. 09/096,131 and now U.S. Pat. No. 6,143,155 "Method and Apparatus for Simultaneous Non-Contact Electrochemical Plating and Planarization of Semiconductor Wafers using a BiPolar electrode Assembly"; Ser. No. 09/096,220 and now U.S. Pat. No. 6,132,586 "Method and Apparatus for Non-Contact Metal Plating of Semiconductor Wafers using a BiPolar electrode Assembly"; and Ser. No. 09/096,309 "Method and Apparatus Planarization of Semiconductor Wafers using a BiPolar electrode Assembly" describe the use of bipolar electrodes for plating, planarization, and simultaneous plating and planarization and are hereby incorporated by reference. The present invention combines the measurement technique with the above pending patent applications and utilizes the electrodes for both measuring the metal film 21 and creating processes that affect the thickness of the metal films 21. The probe 20 points A and B may be driven with low amplitude AC signals, possibly superimposed on a DC offset, that may cause plating and/or deplating to occur, especially in the areas near the probes 20. From the pure perspective of determining the endpoint, care should be taken to limit the plating and deplating effect.

If a sufficiently dense area of probes 20 are used, for example one probe per $cm^2$, it is possible to intentionally deplate areas that have metal to make the clearing of the metal film 21 above vias and trenches more uniform and thereby lessen the dishing effect.

The use of a dense array of electrical probes 20 may also be used advantageously to determine in situ the approximate thickness of a thin metal film 21 in the vicinity of a probe 20. More precisely, the local impedance may be used to feed back a control signal that would adjust the local bias signal being used to drive the probes 20. Thus, the local AC signal plus DC offset may be adjusted in situ to either enhance or detract from the removal rate of the thin metal film 21 in the vicinity of a given probe 20.

It will be understood that the foregoing description is of preferred exemplary embodiments of the invention and that the invention is not limited to the specific forms shown or described herein. Various modifications may be made in the design, arrangement and type of elements disclosed herein, as well as the steps of making and using the invention without departing from the scope of the invention as expressed in the appended claims.

We claim:

1. An apparatus for monitoring the thickness of a conductive layer on a wafer surface comprising:
    a) a working surface of the apparatus adapted for planarizing a wafer;
    b) a probe positioned within the working surface of the apparatus in electrical communication with a conductive layer on the surface of the wafer, the electrical communication being substantially free of electromagnetic waves;
    c) a metrology instrument adapted to take measurements in communication with the probe;
    d) a control system for receiving the measurements from the metrology instrument.

2. An apparatus as in claim 1, wherein the probe comprises at least two contact points.

3. An apparatus as in claim 2 wherein the contact points of the probe are in direct contact with the conducting layer on the surface of the wafer.

4. An apparatus as in claim 2 wherein the contact points of the probe are electrically coupled to the conducting layer on the surface of the wafer by a conductive solution.

5. An apparatus as in claim 2 wherein the contact points of the probe are placed in a conductive slug that electrically couples the contact points of the probe to the conducting layer on the surface of the wafer.

6. An apparatus as in claim 2, wherein the metrology instrument comprises an ohmmeter.

7. An apparatus as in claim 2, wherein the probe comprises four contact points.

8. An apparatus as in claim 7, wherein the four contact points form a square shaped pattern.

9. An apparatus as in claim 8 wherein said square shaped pattern comprises four sides which are preferably 10 mm in length.

10. An apparatus as in claim 7, wherein the metrology instrument comprises:
    a current source adapted to provide a known current between first and second contact points of the probe; and
    a voltmeter adapted to read the voltage between third and fourth contact points of the probe.

11. An apparatus as in claim 10, wherein the contact points of the probe are in direct contact with the conducting layer on the surface of the wafer.

12. An apparatus as in claim 10, wherein the contact points of the probe are electrically coupled to the conducting layer on the surface of the wafer by a conductive solution.

13. An apparatus as in claim 10, wherein the contact points of the probe are placed in a conductive slug that electrically couples the contact points of the probe to the conducting layer on the surface of the wafer.

14. A method of detecting endpoint during chemical mechanical planarization comprising the steps of:
   a) causing relative motion between a wafer's surface and a working surface of a CMP apparatus to remove material from the surface of the wafer;
   b) positioning a probe having at least two contact points within the working surface of the CMP apparatus such that the contact points are in electrical communication with the surface of the wafer, the electrical communication being substantially free of electromagnetic waves;
   c) inducing a current into the wafer between the contact points of the probe; and
   d) measuring a voltage between the contact points on the probe.

15. The method of claim 14 further comprising the steps of:
   e) repeating steps c and d until the voltage read indicates the conducting layer has reached a predetermined characteristic; and
   f) terminating the planarization process when the predetermined characteristic is met.

16. The method of claim 14 wherein said probe comprises four contact points and the current is induced between first and second contact points and the voltage is measured between third and fourth contact points.

17. The method of claim 14 wherein the electrical communication is accomplished by direct physical contact between the contact points on the probe and the wafer surface.

18. The method of claim 14 wherein the electrical communication is accomplished by coupling the contact points on the probe to the wafer surface via a conductive solution.

19. The method of claim 14 wherein the electrical communication is accomplished by coupling the contact points on the probe to the wafer surface via conductive slugs.

* * * * *